United States Patent Office 3,140,946
Patented July 14, 1964

3,140,946
ELECTROPHOTOGRAPHIC MATERIAL
Paul Maria Cassiers, Mortsel-Antwerp, and Jozef Frans Willems, Wilrijk-Antwerp, Belgium, assignors to Gevaert Photo-Producten N.V., Mortsel, Belgium, a Belgian company
No Drawing. Filed Dec. 9, 1960, Ser. No. 74,791
Claims priority, application Belgium Dec. 9, 1959
7 Claims. (Cl. 96—1)

The present invention relates to an electrophotographic material and more particularly to an electrophotographic material consisting of a conductive backing support and a photoconductive layer which contains an organic photoconductive substance or which consists of an organic photoconductive substance.

Electrophotographic materials are already known which consist of a support and a photoconductive layer containing as a photoconductor, an inorganic substance such as selenium or zinc oxide or an organic substance such as anthracene, benzidine or a heterocyclic compound of a determined type.

Now we have found that electrophotographic material with particularly favorable properties and which is suitable to be used in the application of the most widely varying electrophotographic reproduction methods is obtained if in the manufacture of the photoconductive layer compounds are used corresponding to one of the following general formulae:

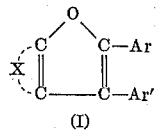

(I)

and

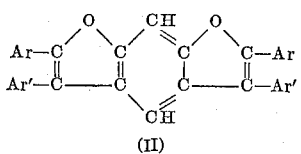

(II)

wherein:

Ar and Ar' each represent a member selected from the group consisting of an aryl radical such as phenyl radical and a substituted aryl radical such as a methoxyphenyl radical and a dimethylamino phenyl radical;

X represents the atoms necessary to complete an arylene nucleus such as a phenylene or a naphthalene nucleus of which one of the hydrogen atoms can be substituted by a substituent such as an hydroxyl group.

Some compounds according to the above formulae which seemed to be particularly suitable for the manufacture of the electrophotographic material according to the present invention are given hereinafter in the table.

TABLE

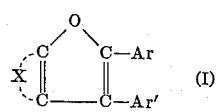

(I)

| | X | Ar | Ar' |
|---|---|---|---|
| 1 | HO—C(CH)—HC=CH— (phenol ring) | phenyl | phenyl—N(CH₃)₂ |
| 2 | HO—C(CH)—HC=CH— (phenol ring) | phenyl—O—CH₃ | phenyl—O—CH₃ |
| 3 | HC(CH)=C—C (naphthol) | phenyl | phenyl—N(CH₃)₂ |
| 4 | HC(CH)=C—C (naphthol) | phenyl—O—CH₃ | phenyl—O—CH₃ |

$$\text{Ar—C}(=O)\text{—C}=\text{C(CH)}=\text{C—C}(=O)\text{—Ar} \quad (II)$$

| | | Ar | Ar' |
|---|---|---|---|
| 5 | | phenyl | phenyl—N(CH₃)₂ |
| 6 | | phenyl—O—CH₃ | phenyl—O—CH₃ |

The compounds according to the general Formula I can be prepared in a very simple way, viz. by condensing compounds according to the formula Ar—CHOH—CO—Ar' wherein Ar and Ar' have the same significance as above, with aromatic hydroxy compounds such as for instance phenols, naphthols, etc. in a suitable solvent such as for instance dioxane and in presence of concentrated hydrochloric acid. This method is among others described in J. Chem. Soc., 1958, p. 4305.

As an example of synthesis the preparation of 6-hydroxy-2-phenyl-3-(p-dimethylaminophenyl) - benzofurane (compound 1 of the table) is given hereinafter.

10.2 g. of p-dimethylaminobenzoine, 4.4 g. of resorcine, 120 cm.³ of peroxide free dioxane and 40 cm.³ of concentrated hydrochloric acid are brought into a 250 cm.³ flask provided with a reflux condenser. The reaction mixture is boiled for 2 hours and poured out into 1 l. of diluted ammonia. The pale pink precipitate is recrystallized from aqueous methanol. Melting point: 212° C.

The following compounds are prepared in analogous way:

6-hydroxy-2,3-di(p-methoxyphenyl) - benzofurane (compound 2 of the table). Melting point: 134° C.
1-(p-dimethylaminophenyl) - 2 - phenylnaphtho(2,1b)-furane (compound 3 of the table). Melting point: 162° C.
1,2-di(p-methoxyphenyl) - naphtho - (2,1b)furane (compound 4 of the table). Melting point: 116° C.

The compounds according to the general Formula II can likewise be prepared in a very simple way namely by condensing compounds according to the formula Ar—CHOH—CO—Ar′ wherein Ar and Ar′ have the same significance as above with aromatic dihydroxy compounds such as resorcine, according to a method analogous to that for the preparation of the compounds according to Formula I provided, however, that a double molar amount of the compound Ar—CHOH—CO—Ar′ must be used.

Compounds which were prepared according to this method are for instance:

2,3,5,6-tetra-(p-methoxyphenyl) - furo - (3,2f) - benzofurane (compound 6 of the table). Melting point: 221° C.
2,6 - diphenyl - 3,5 - di(p-dimethylaminophenyl) - furo-(3,2f)-benzofurane (compound 5 of the table). Melting point: 202° C.

For the manufacture of the electrophotographic material according to the present invention, a photoconductive layer containing at least one of the compounds with Formula I or II above or consisting mainly of at least one of the compounds according to Formula I or II, is applied to a suitable support.

In the manufacture of the electrophotographic material according to the present invention there is preferably used as support in intimate surface contact with the photoconductive layer an electroconductive backing member which is an electroconductive plate or sheet or an insulating plate or insulating sheet which is provided with an electroconductive layer. By the term "electroconductive plate, sheet or layer" is understood a plate, sheet or layer the specific resistivity of which is inferior to that of the photoconductive layer i.e. in general inferior to 10⁹ ohm-cm. Supports with a specific resistivity which is inferior to 10⁵ ohm-cm. are preferably used.

As suitable electroconductive plates may e.g. be mentioned aluminum, zinc, copper, tin, iron, or lead plates. Suitable electroconductive layers are described in the Belgian patent specification 587,301.

Suitable insulating plates are e.g. glass plates; these plates must be coated with a conductive layer, e.g. with a transparent silver, gold or stannous oxide layer deposited thereon e.g. by vacuum coating.

Suitable insulating sheets are e.g. films of synthetic macromolecular substances with a high specific resistivity such as e.g. the polysulphonates described in U.S. patent application Serial No. 797,587, filed March 6, 1959, polyesters such as described in the U.S. patent applications Serial No. 702,252, filed December 12, 1957, Serial No. 725,498, filed April 1, 1958 and Serial No. 731,874, filed April 30, 1958, polystyrene, polyethylene, cellulose esters etc., or paper sheets with a high specific resistivity. To serve as electroconductive backing the insulating sheets must be provided with a conductive layer e.g. a thin metal sheet or with a layer comprising a metal powder dispersed in the smallest possible amount of binding agent, or with a thin hydrophilic layer comprising a hygroscopic and/or antistatic compound and a hydrophilic binding agent. Suitable hygroscopic and/or antistatic compounds are described in the Belgian patent specification 587,301. In order to obtain a good adhesion between the hydrophilic layer and the hydrophobic polymer sheet, the polymer sheet can be provided with a suitable adhesive layer such as e.g. the adhesive layer described in the Belgian patent specification 587,301.

It has been stated that very good results can be attained when using paper sheets provided with a layer of polymer substance in order to give the paper a smooth surface and in order to avoid that the organic liquid wherein the photoconductive substance is dissolved, would penetrate into the paper sheet. This layer, however, must not prevent the carrying off of the electrons from the exposed image areas during the irradiation. Suitable coatings are for instance coatings with a thickness of 2 to 10 mμ composed of 1 or more macromolecular compounds described in the Belgian Patent 587,301 as a binding agent for the photoconductive compound. Besides the usual paper sorts also synthetic paper sorts such as described in said Belgian Patent 587,301 can be used.

For obtaining a good adhesion between the hydrophilic layer and the hydrophobic sheets the polymer sheets can be provided with a suitable adhesive layer such as e.g. one of the adhesive layers described in said Belgian Patent 587,301. The application of photoconductive layers to a support is likewise described in said Belgian patent specification 587,301.

For the manufacture of electrophotographic material according to the present invention, at least one of the photoconductive compounds corresponding to the above mentioned general formulae is incorporated in an amount of at least 80% by weight of the total amount of photoconductive compounds into the photoconductive layer. Preferably, the photoconductive layer consists for more than 95% of photoconductive compounds corresponding to one of the above mentioned formulae.

If, however, the photoconductive material is composed on the base of a photoconductive polymer, one of the compounds according to the present invention can be added as a sensitizer (0.1 to 5%) to the photoconductive polymer.

Besides one or more of the compounds corresponding to the above mentioned general formulae the photoconductive layers according to the present invention can contain still one or more photoconductive compounds with similar or different photoelectric, mechanical or other physical properties. Moreover still other compounds can be present in the photoconductive layer which compounds confer the desired properties to the photoconductive layer and/or to the composition wherefrom this layer is formed.

In the manufacture of photoconductive layers according to the present invention, binding agents can be used such as described in the Belgian patent specification 587,-301. Further other additives can still be used which are well known in the coating technique such as for instance pigments, compounds which influence the glossing and the viscosity, compounds which counteract the aging and the oxidation, or which influence the heat stability of the layer. When choosing these additives, those are preferred which reduce the dark-resistivity of the photoconductive layer either little or not at all.

The thickness of the layers is not critically established but is determined by the requirements of each separate case. Good results are attained with electrophotographic layers the thickness of which varies between 1 and 20μ and preferably between 3 and 10μ.

Finally, according to the present invention compounds which themselves either possess or not photoconductive properties and which cause an increase of the general sensitivity and/or cause an increase of the sensitivity to electromagnetic rays from a determined part of the spectrum can also be present in the photoconductive layers.

The general sensitivity and/or the sensitivity to electromagnetic rays from the visible part of the spectrum can be increased by adding to the photoconductive layer one or more compounds chosen from one or more compounds described in the Belgian patent specification 588,050 from classes A to T inclusive, as well as one or more compounds described in the Belgian patent application 40,049, filed September 13, 1960, and one or more compounds described in the Belgian patent application 40,107, filed October 4, 1960. Preferably this quantity varies from 0.1 to 5% in respect of the amount of the compound according to the above-mentioned formula which amount is used as a photoconductor. As suitable sensitizers for this purpose the aryl methane dyestuffs with ring closure such as e.g. Rhodamine (Color Index 45,170) and the cyanine dyestuffs may be cited.

The electrophotographic materials according to the present invention can be used in any of the different techniques whatever which are based on the exposure and the discharge of an electrostatic charge introduced in or provided on a photoconductive layer.

The electrostatic charging of the photoconductive layer is carried out according to one of the methods as described in the Belgian patent specification 587,301. The exposure, the transfer of the image, if any, the development and fixation are also as described in said Belgian patent specification 587,301.

Evidently, the present invention is by no means limited to one or other particular embodiment as regards the use of the new electrophotographic materials, and the exposure technique, the charging method, the transfer (if any), the developing method, and the fixing method as well as the materials used in these methods can be adapted to the requirements of the technique.

Electrophotographic materials according to the present invention can be applied in reproducing techniques wherein different kinds of radiations, electromagnetic radiations as well as nuclear radiations are used. For this reason, it should be pointed out that although the invention is mainly intended for being applied in connection with methods comprising an exposure, the term "electrophotography" wherever appearing in the description and the claims, must be broadly understood and comprises both xerography and xeroradiography.

The following examples illustrate the present invention without limiting, however, the scope thereto.

*Example 1*

The following solution is prepared by heating:

| | |
|---|---|
| The polyester of isophthalic acid and 4,4'-dihydroxydiphenyl methane | g-- 50 |
| Methylene chloride | cm.$^3$-- 500 |
| Dimethylformamide | cm.$^3$-- 500 |
| Compound 2 of the table | g-- 50 |

The preparation of polyester is described in the Belgian patent specification 563,173. This solution is coated on a 90 g./sq. m. paper and dried by a warm air current. The dried layer has a thickness of 12 m$\mu$. The electrophotographic material obtained is charged electrostatically and according to the reflex method exposed to a paper sheet on which has been written on both sides. The exposing time is 8 sec. with an incandescent 100 watt lamp placed at a distance of 10 cm. Next, this material is developed in the usual way with a powder composed of resin and carbon black whereafter the powder image obtained is transferred electrostatically onto writing paper and fixed. For this purpose e.g. developing powders such as described in U.S. Patents Nos. 2,659,670 and 2,753,308 may be used.

*Example 2*

The following solution is prepared by heating:

| | |
|---|---|
| The polyester of isophthalic acid and 4,4'-dihydroxydiphenylmethylisobutylmethane | g-- 50 |
| Methylene chloride | cm.$^3$-- 500 |
| Dimethylformamide | cm.$^3$-- 500 |
| Compound 1 of the table | g-- 50 |

The preparation of the polyester is described in the Belgian patent specification 563,173. The solution is applied at 40° C. to a baryta coated paper and quickly dried. The dried layer has a thickness of 10 m$\mu$. After negative charging, the electrophotographic material obtained is exposed through a diapositive for 8 sec. with an incandescent 100 watt lamp placed at a distance of 10 cm., developed and fixed in the usual way.

*Example 3*

A baryta-coated paper is provided with a 10% Pentalyn G (commercial name for a colophonium pentaerythritol ester marketed by Hercules Powder Co.) in methylene chloride. After drying, the layer has a thickness of 4 m$\mu$. On this layer is coated at 40° C. a solution containing by dissolving 12 g. of compound 6 of the table and 0.15 g. of 1,1'-diethyl-4,4'-cyanine iodide dissolved in a heated mixture composed of 30 cm.$^3$ of dimethyl formamide and 40 cm.$^3$ of acetone. After quickly drying with infrared rays the thickness of the layer obtained is 8 m$\mu$. The negatively charged material is exposed through a diapositive and for 2.2 seconds with a 100 watt-lamp placed at a distance of 10 cm. The formed image is then developed in the usual way and fixed.

*Example 4*

A paper without wool fibres of 70 g./sq. m. is coated with an Acronal 400 D layer (commercial name for a dispersion of acrylic acid ester copolymer marketed by Badische Aniline- & Soda-Fabrik). After drying this layer has a thickness of 4 m$\mu$. 10 g. of the compound 3 of the table and 0.12 g. of 1,1'-diethyl-2,2'-cyanine iodide are dissolved in a mixture composed of 20 cm.$^3$ of dimethyl formamide 10 cm.$^3$ of dioxane and 70 cm.$^3$ of acetone. This solution is coated at 30° C. on the Acronal 400 D layer and dried by a warm air current. The dried layer has a thickness of 7 m$\mu$. The sensitive material is charged with an electrostatic charge and exposed to a line copy for 1.7 sec. with an electric light source of 100 watts placed at a distance of 10 cm. The formed image is developed and fixed in the usual way.

*Example 5*

A 90 g./sq. m. baryta-coated paper is coated with Mowilith M70 (commercial name for polyvinyl acetate marketed by Hoechst A.G.). As solvent for this polymer a mixture of 80 parts by volume of methyl ethylcetone and 20 parts of butyl acetate is used. The dried layer has a thickness of 3 m$\mu$.

To this layer a dispersion obtained by dispersing in warm state at 35° C. 10 g. of the compound 4 of the table in 20 cm.$^3$ of dimethylformamide is applied. Before coating, 80 cm.$^3$ of methylethyl cetone and 0.1 g. of d'Astraphloxine FF extra (C.I. 48,070) are added. After drying with warm air at 45° C. the layer obtained has a thickness of 9 to 10 m$\mu$. This material is dried and negative charged and exposed through a positive microscopic film image, developed with a toner-carrier mixture and fixed in the usual way.

We claim:

1. In a method of reproduction wherein an electrostatic charge pattern is created on a photoconductive insulating layer and which includes the steps of electrostatically charging and imagewise exposing said photoconductive insulating layer, the improvement of using in said method a photoconductive insulating layer containing as the essential photoconductive material an organic compound having a structural formula selected from the group consisting of:

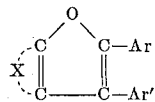

and

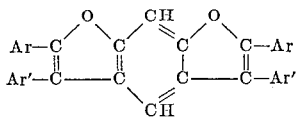

wherein:

X represents the atoms necessary to complete an arylene nucleus;

Ar and Ar' are each a member selected from the group consisting of a phenyl radical, a methoxy substituted phenyl radical, and a dimethylamino substituted phenyl radical.

2. The reproduction method of claim 1 wherein said organic compound is 6-hydroxy-2-phenyl-3-(p-dimethylaminophenyl)-benzofurane.

3. The electrophotographic material of claim 1 wherein said organic compound is 1,2-di(p-methoxyphenyl)naphtho-(2,1b)furane.

4. The reproduction method of claim 1 wherein said photoconductive layer contains in addition to said organic compound, a minor amount of an optical sensitizing dyestuff selected from the group consisting of cyanine dye and an arylmethane dyestuff with ring closure.

5. The reproduction method of claim 1 wherein said organic compound constitutes at least about 80% by weight of the total photoconductive substances in said layer.

6. The reproduction method of claim 1 including the further step of developing said electrostatic charge pattern with electrostatically attractable material.

7. The reproduction method of claim 1 wherein X represents the atoms necessary to close a phenylene nucleus, Ar is phenyl, and Ar' is dimethylamino-phenyl.

References Cited in the file of this patent

UNITED STATES PATENTS

| | | |
|---|---|---|
| 2,069,803 | Heckert | Feb. 9, 1937 |
| 2,692,178 | Grandadam | Oct. 19, 1954 |
| 2,852,503 | Long et al. | Sept. 16, 1958 |
| 2,937,188 | Hoefle | May 17, 1960 |
| 3,072,479 | Bethe | Jan. 8, 1963 |

FOREIGN PATENTS

| | | |
|---|---|---|
| 562,336 | Belgium | May 13, 1958 |

OTHER REFERENCES

Siegriest: Das Papier, vol. 8, No. 7/8, pp. 109–120 (April 1945), TS 1080, p. 29.

Pringsheim: Fluorescence and Phosphorescence, Interscience (1949), pp. 364–366 and 415–420.

Wainer: "Photo Engineering," vol. 3, No. 1, 1952, pp. 12–22.

UNITED STATES PATENT OFFICE
CERTIFICATE OF CORRECTION

Patent No. 3,140,946                  July 14, 1964

Paul Maria Cassiers et al.

It is hereby certified that error appears in the above numbered patent requiring correction and that the said Letters Patent should read as corrected below.

Column 7, line 27, for "electrophotographic material" read -- reproduction method --.

Signed and sealed this 9th day of February 1965.

(SEAL)
Attest:

ERNEST W. SWIDER
Attesting Officer

EDWARD J. BRENNER
Commissioner of Patents